(12) United States Patent
Sherman et al.

(10) Patent No.: US 9,228,117 B2
(45) Date of Patent: Jan. 5, 2016

(54) STRETCH RELEASING OPTICALLY CLEAR PRESSURE SENSITIVE ADHESIVE

(75) Inventors: Audrey A. Sherman, St. Paul, MN (US); Scott M. Tapio, Falcon Heights, MN (US); Wendi J. Winkler, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 686 days.

(21) Appl. No.: 12/811,973

(22) PCT Filed: Jan. 5, 2009

(86) PCT No.: PCT/US2009/030084
§ 371 (c)(1),
(2), (4) Date: Oct. 6, 2010

(87) PCT Pub. No.: WO2009/089137
PCT Pub. Date: Jul. 16, 2009

(65) Prior Publication Data
US 2011/0020640 A1 Jan. 27, 2011

Related U.S. Application Data

(60) Provisional application No. 61/020,423, filed on Jan. 11, 2008.

(51) Int. Cl.
 *C09J 183/04* (2006.01)
 *C09J 7/02* (2006.01)

(52) U.S. Cl.
CPC .............. *C09J 7/0207* (2013.01); *C09J 7/0225* (2013.01); *C09J 183/04* (2013.01); *C09J 2201/618* (2013.01); *C09J 2483/00* (2013.01); *Y10T 428/28* (2015.01)

(58) Field of Classification Search
CPC ........................ A47G 1/175; C09J 2201/618
See application file for complete search history.

(56) References Cited

U.S. PATENT DOCUMENTS 2,676,182 A 4/1954 Herbert
2,736,721 A 2/1956 Dexter
(Continued)

FOREIGN PATENT DOCUMENTS

DE 3331016 10/1984
EP 0355991 2/1990
(Continued)

OTHER PUBLICATIONS

Encyclopedia of Polymer Science and Engineering, New York, John Wiley & Sons, (1989), vol. 15, pp. 265-270.
(Continued)

*Primary Examiner* — Frank D Ducheneaux
(74) *Attorney, Agent, or Firm* — Jeffrey M. Olofson

(57) ABSTRACT

Optically clear stretch releasing pressure sensitive adhesive films containing a silicone pressure sensitive adhesive composition and a tacky tab are provided. The pressure sensitive adhesive compositions are formed from elastomeric silicone polymer selected from the group consisting of urea-based silicone copolymers, oxamide-based silicone copolymers, amide-based silicone copolymers, urethane-based silicone copolymers, polydiorganosiloxane polymers, or mixtures of these copolymers. The pressure sensitive adhesive compositions may also contain an MQ tackifying resin. The pressure sensitive adhesive compositions may be used to form adhesive articles.

13 Claims, 1 Drawing Sheet

(56) References Cited

U.S. PATENT DOCUMENTS

| | | | |
|---|---|---|---|
| 2,814,601 | A | 11/1957 | Currie |
| 2,857,356 | A | 10/1958 | Goodwin |
| RE24,906 | E | 12/1960 | Ulrich |
| 3,527,842 | A | 9/1970 | Clark |
| 3,528,940 | A | 9/1970 | Modic |
| 3,627,851 | A | 12/1971 | Brady |
| 3,772,247 | A | 11/1973 | Flannigan |
| 3,890,269 | A | 6/1975 | Martin |
| 3,983,298 | A | 9/1976 | Hahn |
| 4,024,312 | A | 5/1977 | Korpman |
| 4,309,520 | A | 1/1982 | Blizzard |
| 4,472,480 | A | 9/1984 | Olson |
| 4,661,577 | A | 4/1987 | Jo Lane |
| 4,707,531 | A | 11/1987 | Shirahata |
| 4,736,048 | A | 4/1988 | Brown |
| 4,774,297 | A | 9/1988 | Murakami |
| 4,774,310 | A | 9/1988 | Butler |
| 4,831,070 | A | 5/1989 | McInally |
| 4,900,474 | A | 2/1990 | Terae |
| 4,925,671 | A | 5/1990 | Abber |
| 4,935,484 | A | 6/1990 | Wolfgruber |
| 4,980,443 | A | 12/1990 | Kendziorski |
| 5,026,890 | A | 6/1991 | Webb |
| 5,028,679 | A | 7/1991 | Terae |
| 5,110,890 | A | 5/1992 | Butler |
| 5,118,775 | A | 6/1992 | Inomata |
| 5,147,957 | A | 9/1992 | Kumar |
| 5,214,119 | A | 5/1993 | Leihr |
| 5,223,465 | A | 6/1993 | Ueki |
| 5,236,997 | A | 8/1993 | Fujiki |
| 5,248,739 | A | 9/1993 | Schmidt |
| 5,262,558 | A | 11/1993 | Kobayashi |
| 5,276,122 | A | 1/1994 | Aoki |
| 5,302,685 | A | 4/1994 | Tsumura |
| RE34,605 | E | 5/1994 | Schrenk |
| 5,308,887 | A | 5/1994 | Ko |
| 5,319,040 | A | 6/1994 | Wengrovius |
| 5,360,659 | A | 11/1994 | Arends |
| 5,461,134 | A | 10/1995 | Leir |
| 5,512,650 | A | 4/1996 | Leir |
| 5,516,581 | A | 5/1996 | Kreckel |
| 5,561,203 | A * | 10/1996 | Strong et al. .................. 525/477 |
| 5,579,162 | A | 11/1996 | Bjornard |
| 5,882,774 | A | 3/1999 | Jonza |
| 6,049,419 | A | 4/2000 | Wheatley |
| 6,106,937 | A * | 8/2000 | Hamerski ..................... 428/343 |
| 6,339,111 | B1 | 1/2002 | Moon |
| 6,355,759 | B1 | 3/2002 | Sherman |
| 6,403,206 | B1 * | 6/2002 | Bries et al. ..................... 428/220 |
| 6,531,620 | B2 | 3/2003 | Brader |
| 6,569,521 | B1 | 5/2003 | Sheridan et al. |
| 7,078,093 | B2 | 7/2006 | Sheridan |
| 7,153,924 | B2 | 12/2006 | Kuepfer |
| 2003/0211317 | A1 | 11/2003 | Sheridan |
| 2004/0109096 | A1 * | 6/2004 | Anderson .............. C09J 7/0207 348/832 |
| 2005/0136266 | A1 | 6/2005 | Zhou |
| 2007/0059520 | A1 * | 3/2007 | Hatin .................... G06F 3/0412 428/343 |
| 2007/0077418 | A1 | 4/2007 | Sakurai |
| 2007/0148475 | A1 | 6/2007 | Sherman |
| 2007/0177272 | A1 * | 8/2007 | Benson et al. ................ 359/584 |
| 2007/0297736 | A1 | 12/2007 | Sherman |
| 2014/0147667 | A1 | 5/2014 | Determan |

FOREIGN PATENT DOCUMENTS

| | | |
|---|---|---|
| EP | 0393426 | 10/1990 |
| GB | 998232 | 7/1965 |
| JP | 2-36234 | 2/1990 |
| JP | 2-58587 | 2/1990 |
| JP | 2005194525 | 7/2005 |
| WO | WO 95-06691 | 3/1995 |
| WO | WO 96-34028 | 10/1996 |
| WO | WO 96-34030 | 10/1996 |
| WO | WO 96-35458 | 11/1996 |
| WO | WO 97-40103 | 10/1997 |
| WO | WO 98-17726 | 4/1998 |

OTHER PUBLICATIONS

Smith-Gillespie, Robert, Bandel, W., "LCD Ruggedization in Displays With Optically Bonded AR Glass Lamination", Proceedings of the Third Americas Display Engineering and Applications Conference, ADEAC 2006, Oct. 2006, vol. 2006 pp. 78-82 DuPont Display Enhancements.

The Handbook of Pressure-Sensitive Adhesive Technology, Satas, pp. 346, (1982).

Tyagi D.,"Segmented Organosiloxane Copolymers: 2 Thermal and Mechanical Properties of Siloxane-Urea Copolymers", *Polymer*, Dec. 1984, vol. 25, Issue 12, pp. 1807-1816.

Search Report for PCT/US2009/030084, 3 pages.

* cited by examiner

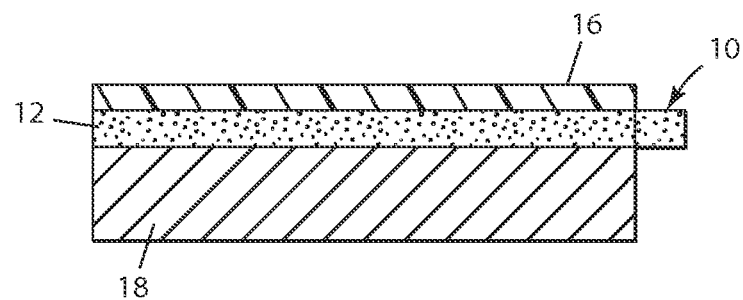

STRETCH RELEASING OPTICALLY CLEAR PRESSURE SENSITIVE ADHESIVE

CROSS REFERENCE TO RELATED APPLICATIONS

This application is a national stage filing under 35 U.S.C. 371 of PCT/US2009/030084, filed Jan. 5, 2009, which claims priority to U.S. Provisional Application No. 61/020,423, filed Jan. 11, 2008, the disclosure of which is incorporated by reference in its/their entirety herein.

FIELD OF THE DISCLOSURE

The disclosure relates to pressure sensitive adhesives that are optically clear and stretch releasing.

BACKGROUND

Stretch releasing adhesive tapes are often used to bond to a substrate and then release from the substrate upon stretching. Stretch releasing adhesive tapes are useful in a variety of applications including, e.g., assembling, joining, attaching and mounting applications. The stretch releasing tape can be removed from the substrate by stretching the tape at an angle to the surface of the substrate to which it is bonded.

Many stretch releasing adhesive tapes, once bonded to a substrate, e.g., wallboard, are cleanly removable from the substrate such that there is no visible residue remaining on the substrate and no visible damage to the substrate.

SUMMARY

Optically clear pressure sensitive adhesives are adhesives that are capable of being used in optical articles. It would be desirable in many instances if such optically clear pressure sensitive adhesives were stretch releasing for easy removal. Elastomeric silicone-based polymers have been found to produce such optically clear stretch releasing pressure sensitive adhesives.

Disclosed are stretch releasing adhesive films comprising a silicone pressure sensitive adhesive composition and a tacky tab. The pressure sensitive adhesive compositions comprise an elastomeric silicone polymer selected from the group consisting of urea-based silicone copolymers, oxamide-based silicone copolymers, amide-based silicone copolymers, urethane-based silicone copolymers, polydiorganosiloxane polymers, and mixtures thereof. The pressure sensitive adhesive compositions may also comprise an MQ tackifying resin.

Also disclosed are articles comprising a first substrate and a stretch releasing pressure sensitive adhesive film disposed on a surface of the first substrate, wherein the stretch releasing pressure sensitive adhesive film comprises a silicone pressure sensitive adhesive composition and a tacky tab. The articles may also optionally contain a second substrate. The substrates may be rigid (such as the surface of a device, a glass plate, etc) or they may be non-rigid (such as a release liner, tape backing, film, sheet, etc).

The disclosure also discloses methods for removably bonding an assembly comprising providing a first substrate, disposing a stretch releasing adhesive film on at least a portion of the surface of the substrate, wherein the stretch releasing pressure sensitive adhesive film comprises a silicone pressure sensitive adhesive composition and a tacky tab, and contacting a second substrate with the stretch releasing pressure sensitive adhesive such that the second substrate is bonded to first substrate through the stretch releasing pressure sensitive adhesive and the tacky tab is available for grasping by a user.

In some embodiments the disclosure includes assemblies comprising a first substrate, a second substrate, and a stretch releasing pressure sensitive adhesive disposed between the first substrate and the second substrate, wherein the stretch releasing pressure sensitive adhesive comprises a silicone pressure sensitive adhesive composition and a tacky tab. The substrates may be rigid (such as the surface of a device, a glass plate, etc) or they may be non-rigid (such as a release liner, tape backing, film, sheet, etc).

BRIEF DESCRIPTION OF THE DRAWINGS

FIG. 1 is a side view of an adhesive construction with a stretch releasing adhesive film attached to two substrates.

DETAILED DESCRIPTION

A stretch releasing pressure sensitive adhesive film is provided which is optically clear, making it suitable for a variety of end use applications where an optically clear stretch releasable adhesive is desirable, such as, for example, in optical devices or in applications where it is desirable that the adhesive be inconspicuous. The pressure sensitive adhesive comprises a silicone elastomeric polymer and may contain other components such as tackifying resins. The pressure sensitive adhesive is useful as a single layer, not requiring the presence of other extensible layers. If desired, additional extensible layers can be used in conjunction with the disclosed pressure sensitive adhesive. The pressure sensitive adhesive also has a tacky tab. The tacky tab allows for easy grasping and stretch releasing of the pressure sensitive adhesive.

The term "adhesive" as used herein refers to polymeric compositions useful to adhere together two adherends. An example of an adhesive is a pressure sensitive adhesive.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "silicone-based" as used herein refers to macromolecules that contain silicone units. The terms silicone or siloxane are used interchangeably and refer to units with dialkyl or diaryl siloxane (—$SiR_2O$—) repeating units.

The term "urea-based" as used herein refers to macromolecules that are segmented copolymers which contain at least one urea linkage.

The term "amide-based" as used herein refers to macromolecules that are segmented copolymers which contain at least one amide linkage.

The term "urethane-based" as used herein refers to macromolecules that are segmented copolymers which contain at least one urethane linkage.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, and bromoalkyl groups. The term "perfluoroalkyl" refers to an alkyl group in which all hydrogen atoms are replaced by fluorine atoms.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example, —CH$_2$CH$_2$(OCH$_2$CH$_2$)$_n$OCH$_2$CH$_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —R$^a$—Ar$^a$— where R$^a$ is an alkylene and Ar$^a$ is an arylene (i.e., an alkylene is bonded to an arylene).

The term "alkoxy" refers to a monovalent group of formula —OR where R is an alkyl group.

Unless otherwise indicated, "optically clear" refers to an adhesive or article that has a high light transmittance over at least a portion of the visible light spectrum (about 400 to about 700 nm), and that exhibits low haze. An optically clear material often has a luminous transmission of at least about 90 percent and a haze of less than about 2 percent in the 400 to 700 nm wavelength range. Both the luminous transmission and the haze can be determined using, for example, the method of ASTM-D 1003-95.

Unless otherwise indicated, "stretch releasing" refers to a property of an adhesive or tape. Stretch releasing adhesives and tapes form an adhesive bond to at least one substrate and then release from the substrate or substrates upon stretching. Typically, the stretch releasing adhesives and tapes may be cleanly removable from the substrate or substrates with little or no visible residue remaining on the substrate and no visible damage to the substrate.

As used herein, "extensible" refers to materials that are capable of being stretched without breaking or snapping under stretch releasing conditions.

The pressure sensitive adhesive film is extensible, stretchable and preferably cleanly removable (i.e., does not leave a visible residue) from a variety of substrates including, e.g., glass, ceramic, painted wallboard, finished (e.g., stained and varnished) wood and plastics. Plastic substrates include, for example, polyesters such as PET (polyethylene terephthalate), polyacrylates such as PMMA (poly methylmethacrylate), polycarbonates, and the like. The pressure sensitive adhesive film, after having been bonded to a substrate, is also capable of being removed from the substrate without damaging the substrate.

Examples of suitable pressure sensitive adhesive compositions include silicone-based adhesive compositions. The silicone-based adhesive compositions comprise at least one silicone elastomeric polymer and may contain other components such as tackifying resins. The elastomeric polymers include for example, urea-based silicone copolymers, oxamide-based silicone copolymers, amide-based silicone copolymers, urethane-based silicone copolymers, polydiorganosiloxane polymers, and mixtures thereof.

One example of a useful class of silicone elastomeric polymers is urea-based silicone polymers such as silicone polyurea block copolymers. Silicone polyurea block copolymers include the reaction product of a polydiorganosiloxane diamine (also referred to as a silicone diamine), a diisocyanate, and optionally an organic polyamine. Suitable silicone polyurea block copolymers are represented by the repeating unit:

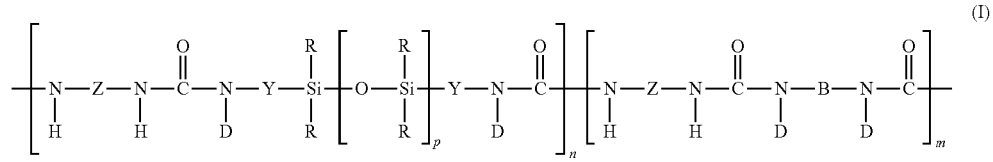

wherein each R is a moiety that, independently, is an alkyl moiety, having about 1 to 12 carbon atoms, and may be substituted with, for example, trifluoroalkyl or vinyl groups, a vinyl radical or higher alkenyl radical represented by the formula R$^2$(CH$_2$)$_a$CH=CH$_2$ wherein R$^2$ is —(CH$_2$)$_b$— or —(CH$_2$)$_c$CH=CH— and a is 1, 2 or 3; b is 0, 3 or 6; and c is 3, 4 or 5, a cycloalkyl moiety having from about 6 to 12 carbon atoms and may be substituted with alkyl, fluoroalkyl, and vinyl groups, or an aryl moiety having from about 6 to 20 carbon atoms and may be substituted with, for example, alkyl, cycloalkyl, fluoroalkyl and vinyl groups or R is a perfluoroalkyl group as described in U.S. Pat. No. 5,028,679, or a fluorine-containing group, as described in U.S. Pat. No. 5,236,997, or a perfluoroether-containing group, as described in U.S. Pat. Nos. 4,900,474 and 5,118,775; typically, at least 50% of the R moieties are methyl radicals with the balance being monovalent alkyl or substituted alkyl radicals having from 1 to 12 carbon atoms, alkenyl radicals, phenyl radicals, or substituted phenyl radicals;

each Z is a polyvalent radical that is an arylene radical or an aralkylene radical having from about 6 to 20 carbon atoms, an alkylene or cycloalkylene radical having from about 6 to 20 carbon atoms, in some embodiments Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof;

each Y is a polyvalent radical that independently is an alkylene radical of 1 to 10 carbon atoms, an aralkylene radical or an arylene radical having 6 to 20 carbon atoms;

each D is selected from the group consisting of hydrogen, an alkyl radical of 1 to 10 carbon atoms, phenyl, and a radical that completes a ring structure including B or Y to form a heterocycle;

where B is a polyvalent radical selected from the group consisting of alkylene, aralkylene, cycloalkylene, phenylene, heteroalkylene, including for example, polyethylene oxide, polypropylene oxide, polytetramethylene oxide, and copolymers and mixtures thereof;

m is a number that is 0 to about 1000;
n is a number that is at least 1; and
p is a number that is at least 10, in some embodiments 15 to about 2000, or even 30 to 1500.

Useful silicone polyurea block copolymers are disclosed in, e.g., U.S. Pat. Nos. 5,512,650, 5,214,119, 5,461,134, and 7,153,924 and PCT Publication Nos. WO 96/35458, WO 98/17726, WO 96/34028, WO 96/34030 and WO 97/40103.

Examples of useful silicone diamines used in the preparation of silicone polyurea block copolymers include polydiorganosiloxane diamines represented by formula II

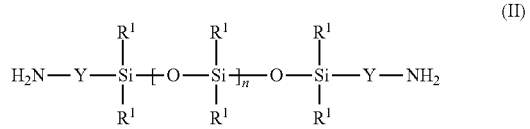
(II)

where each $R^1$ is independently an alkyl, haloalkyl, aralkyl, alkenyl, aryl, or aryl substituted with an alkyl, alkoxy, or halo, each Y is independently an alkylene, aralkylene, or a combination thereof, and n is an integer of 0 to 1500.

The polydiorganosiloxane diamine of Formula II can be prepared by any known method and can have any suitable molecular weight, such as an average molecular weight in the range of 700 to 150,000 g/mole. Suitable polydiorganosiloxane diamines and methods of making the polydiorganosiloxane diamines are described, for example, in U.S. Pat. Nos. 3,890,269, 4,661,577, 5,026,890, 5,276,122, 5,214,119, 5,461,134, 5,512,650, and 6,355,759. Some polydiorganosiloxane diamines are commercially available, for example, from Shin Etsu Silicones of America, Inc., Torrance, Calif. and from Gelest Inc., Morrisville, Pa.

A polydiorganosiloxane diamine having a molecular weight greater than 2,000 g/mole or greater than 5,000 g/mole can be prepared using the methods described in U.S. Pat. Nos. 5,214,119, 5,461,134, and 5,512,650. One of the described methods involves combining under reaction conditions and under an inert atmosphere (a) an amine functional end blocker of the following formula

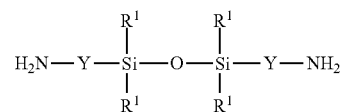

where Y and $R^1$ are the same as defined for Formula II; (b) sufficient cyclic siloxane to react with the amine functional end blocker to form a polydiorganosiloxane diamine having a molecular weight less than 2,000 g/mole; and (c) an anhydrous aminoalkyl silanolate catalyst of the following formula

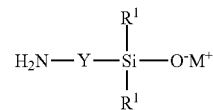

where Y and $R^1$ are the same as defined in Formula II and $M^+$ is a sodium ion, potassium ion, cesium ion, rubidium ion, or tetramethylammonium ion. The reaction is continued until substantially all of the amine functional end blocker is consumed and then additional cyclic siloxane is added to increase the molecular weight. The additional cyclic siloxane is often added slowly (e.g., drop wise). The reaction temperature is often conducted in the range of 80° C. to 90° C. with a reaction time of 5 to 7 hours. The resulting polydiorganosiloxane diamine can be of high purity (e.g., less than 2 weight percent, less than 1.5 weight percent, less than 1 weight percent, less than 0.5 weight percent, less than 0.1 weight percent, less than 0.05 weight percent, or less than 0.01 weight percent silanol impurities). Altering the ratio of the amine functional end blocker to the cyclic siloxane can be used to vary the molecular weight of the resulting polydiorganosiloxane diamine of Formula II.

Another method of preparing the polydiorganosiloxane diamine of Formula II includes combining under reaction conditions and under an inert atmosphere (a) an amine functional end blocker of the following formula

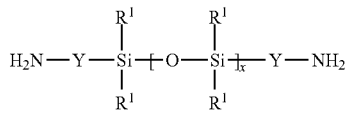

where $R^1$ and Y are the same as described for Formula I and where the subscript x is equal to an integer of 1 to 150; (b) sufficient cyclic siloxane to obtain a polydiorganosiloxane diamine having an average molecular weight greater than the average molecular weight of the amine functional end blocker; and (c) a catalyst selected from cesium hydroxide, cesium silanolate, rubidium silanolate, cesium polysiloxanolate, rubidium polysiloxanolate, and mixtures thereof. The reaction is continued until substantially all of the amine functional end blocker is consumed. This method is further described in U.S. Pat. No. 6,355,759. This procedure can be used to prepare any molecular weight of the polydiorganosiloxane diamine.

Yet another method of preparing the polydiorganosiloxane diamine of Formula II is described in U.S. Pat. No. 6,531,620. In this method, a cyclic silazane is reacted with a siloxane material having hydroxy end groups as shown in the following reaction.

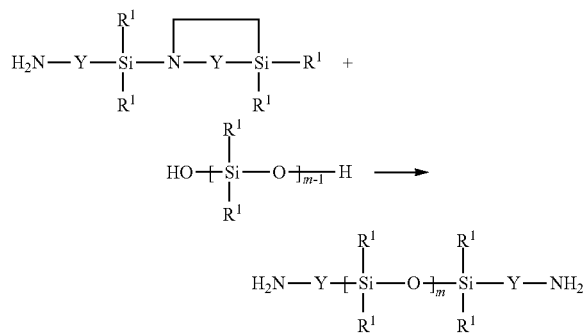

The groups $R^1$ and Y are same as described for Formula II. The subscript m is an integer greater than 1.

Examples of polydiorganosiloxane diamines include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures thereof.

The polydiorganosiloxane diamine component provides a means of adjusting the modulus of the resultant silicone polyurea block copolymer. In general, high molecular weight polydiorganosiloxane diamines provide copolymers of lower modulus whereas low molecular polydiorganosiloxane polyamines provide copolymers of higher modulus.

Examples of useful polyamines include polyoxyalkylene diamines including, e.g., polyoxyalkylene diamines commercially available under the trade designation D-230, D-400, D-2000, D-4000, ED-2001 and EDR-148 from Hunstman Corporation (Houston, Tex.), polyoxyalkylene triamines including, e.g., polyoxyalkylene triamines commercially available under the trade designations T-403, T-3000 and T-5000 from Hunstman, and polyalkylenes including, e.g., ethylene diamine and polyalkylenes available under the trade designations DYTEK A and DYTEK EP from DuPont (Wilmington, Del.).

The optional polyamine provides a means of modifying the modulus of the copolymer. The concentration, type and molecular weight of the organic polyamine influence the modulus of the silicone polyurea block copolymer.

The silicone polyurea block copolymer may include polyamine in an amount of no greater than about 3 moles, in some embodiments from about 0.25 to about 2 moles. Typically the polyamine has a molecular weight of no greater than about 300 g/mole.

Any polyisocyanate including, e.g., diisocyanates and triisocyanates, capable of reacting with the above-described polyamines can be used in the preparation of the silicone polyurea block copolymer. Examples of suitable diisocyanates include aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3', 5,5'-tetraethyl)diphenylmethane, 4,4-diisocyanato-3,3'-dimethoxybiphenyl(o-dianisidine diisocyanate), 5-chloro-2, 4-toluene diisocyanate, and 1-chloromethyl-2,4-diisocyanato benzene, aromatic-aliphatic diisocyanates, such as m-xylylene diisocyanate and tetramethyl-m-xylylene diisocyanate, aliphatic diisocyanates such as 1,4-diisocyanatobutane, 1,6-diisocyanatohexane, 1,12-diisocyanatododecane and 2-methyl-1,5-diisocyanatopentane, and cycloaliphatic diisocyanates such as methylenedicyclohexylene-4,4'-diisocyanate, 3-isocyanatomethyl-3,5,5-trimethylcyclohexyl isocyanate (isophorone diisocyanate) and cyclohexylene-1,4-diisocyanate.

Any triisocyanate that can react with a polyamine, and in particular with the polydiorganosiloxane diamine is suitable. Examples of such triisocyanates include, e.g., polyfunctional isocyanates, such as those produced from biurets, isocyanurates, and adducts. Examples of commercially available polyisocyanates include portions of the series of polyisocyanates available under the trade designations DESMODUR and MONDUR from Bayer and PAPI from Dow Plastics.

The polyisocyanate is typically present in a stoichiometric amount based on the amount of polydiorganosiloxane diamine and optional polyamine.

Another useful class of silicone elastomeric polymers are oxamide-based polymers such as polydiorganosiloxane polyoxamide block copolymers. Examples of polydiorganosiloxane polyoxamide block copolymers are presented, for example, in US Patent Publication No. 2007-0148475. The polydiorganosiloxane polyoxamide block copolymer contains at least two repeat units of Formula III.

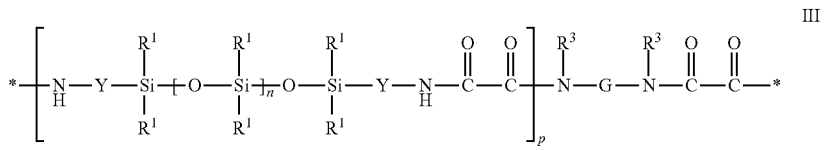

In this formula, each $R^1$ is independently an alkyl, haloalkyl, aralkyl, alkenyl, aryl, or aryl substituted with an alkyl, alkoxy, or halo, wherein at least 50 percent of the $R^1$ groups are methyl. Each Y is independently an alkylene, aralkylene, or a combination thereof. Subscript n is independently an integer of 40 to 1500 and the subscript p is an integer of 1 to 10. Group G is a divalent group that is the residue unit that is equal to a diamine of formula $R^3HN-G-NHR^3$ minus the two $-NHR^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN-G-NHR^3$ is piperazine or the like). Each asterisk (*) indicates a site of attachment of the repeat unit to another group in the copolymer such as, for example, another repeat unit of Formula III.

Suitable alkyl groups for $R^1$ in Formula III typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group having 1 to 10 carbon atoms and an aryl group having 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

At least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula III is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group having 6 to 12 carbon atoms bonded to an alkylene group having 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula III is independently an integer of 40 to 1500. For example, subscript n can be an integer up to 1000, up to 500, up to 400, up to 300, up to 200, up to 100, up to 80, or up to 60. The value of n is often at least 40, at least 45, at least 50, or at least 55. For example, subscript n can be in the range of 40 to 1000, 40 to 500, 50 to 500, 50 to 400, 50 to 300, 50 to 200, 50 to 100, 50 to 80, or 50 to 60.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula III is a residual unit that is equal to a diamine compound of formula $R^3HN-G-NHR^3$ minus the two amino groups (i.e., —$NHR^3$ groups). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN-G-NHR^3$ is piperazine). The diamine can have primary or secondary amino groups. In most embodiments, $R^3$ is hydrogen or an alkyl. In many embodiments, both of the amino groups of the diamine are primary amino groups (i.e., both $R^3$ groups are hydrogen) and the diamine is of formula $H_2N-G-NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of Formula II, which are described above, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

The polydiorganosiloxane polyoxamide tends to be free of groups having a formula —$R^a$—(CO)—NH— where $R^a$ is an alkylene. All of the carbonylamino groups along the backbone of the copolymeric material are part of an oxalylamino group (i.e., the —(CO)—(CO)—NH— group). That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyoxamide is a linear, block copolymer and is an elastomeric material. Unlike many of the known polydiorganosiloxane polyamides that are generally formulated as brittle solids or hard plastics, the polydiorganosiloxane polyoxamides can be formulated to include greater than 50 weight percent polydiorganosiloxane segments based on the weight of the copolymer. The weight percent of the diorganosiloxane in the polydiorganosiloxane polyoxamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyoxamides. Higher amounts of the polydiorganosiloxane can be used to prepare elastomeric materials with lower modulus while maintaining reasonable strength.

Some of the polydiorganosiloxane polyoxamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to about 350° C. Additionally, the copolymers can often be heated at a temperature such as 250° C. for 1 hour in air without apparent degradation as determined by no detectable loss of mechanical strength upon cooling.

The polydiorganosiloxane polyoxamide copolymers have many of the desirable features of polysiloxanes such as low glass transition temperatures, thermal and oxidative stability, resistance to ultraviolet radiation, low surface energy and hydrophobicity, and high permeability to many gases. Additionally, the copolymers exhibit good to excellent mechanical strength.

Another useful class of silicone elastomeric polymers is amide-based silicone polymers. Such polymers are similar to the urea-based polymers, containing amide linkages (—N(D)-C(O)—) instead of urea linkages (—N(D)-C(O)—N(D)-), where C(O) represents a carbonyl group and D is a hydrogen or alkyl group.

Such polymers may be prepared in a variety of different ways. Starting from the polydiorganosiloxane diamine described above in Formula II, the amide-based polymer can be prepared by reaction with a poly-carboxylic acid or a poly-carboxylic acid derivative such as, for example di-esters. In some embodiments, an amide-based silicone elastomer is prepared by the reaction of a polydiorganosiloxane diamine and di-methyl salicylate of adipic acid.

An alternative reaction pathway to amide-based silicone elastomers utilizes a silicone di-carboxylic acid derivative such as a carboxylic acid ester. Silicone carboxylic acid esters can be prepared through the hydrosilation reaction of a silicone hydride (i.e. a silicone terminated with a silicon-hydride (Si—H) bonds) and an ethylenically unsaturated ester. For example a silicone di-hydride can be reacted with an ethylenically unsaturated ester such as, for example, $CH_2=CH—(CH_2)_n—C(O)—OR$, where C(O) represents a carbonyl group and n is an integer up to 15, and R is an alkyl, aryl or substituted aryl group, to yield a silicone chain capped with —Si—$(CH_2)_{n+2}$—C(O)—OR. The —C(O)—OR group is a carboxylic acid derivative which can be reacted with a silicone diamine, a polyamine or a combination thereof. Suitable silicone diamines and polyamines have been discussed above and include aliphatic, aromatic or oligomeric diamines (such as ethylene diamine, phenylene diamine, xylylene diamine, polyoxalkylene diamines, etc).

Another useful class of silicone elastomeric polymers is urethane-based silicone polymers such as silicone polyurea-urethane block copolymers. Silicone polyurea-urethane block copolymers include the reaction product of a polydiorganosiloxane diamine (also referred to as silicone diamine), a diisocyanate, and an organic polyol. Such materials are structurally very similar to the structure of Formula I except that the —N(D)-B—N(D)- links are replaced by —O—B—O— links. Examples are such polymers are presented, for example, in U.S. Pat. No. 5,214,119.

These urethane-based silicone polymers are prepared in the same fashion as the urea-based silicone polymers except that an organic polyol is substituted for an organic polyamine. Typically, since the reaction between a alcohol group and an isocyanate group is slower than the reaction between a amine group and an isocyanate group, a catalyst such as a tin catalyst commonly used in polyurethane chemistry, is used.

Another example of a useful class of silicone polymers is polydiorganosiloxane polymers. Suitable polydiorganosiloxane polymers include, e.g., polydimethylsiloxane and poly-dimethyldiphenylsiloxane polymers having silanol functionality or alkenyl functionality.

The silicone polydiorganosiloxane-based silicone pressure sensitive adhesive compositions can be made by reacting the MQ resin and the polydiorganosiloxane. To achieve such a reaction, two different reaction chemistries have been commonly used: condensation chemistry and addition-cure chemistry.

Briefly, condensation chemistry includes admixing silanol functional MQ tackifying resins that include triorganosiloxy units and $SiO_{4/2}$ units with silanol-endblocked polydiorganosiloxanes as described in, for example, U.S. Pat. Nos. 2,736,721, 2,814,601, 4,309,520, 4,831,070, 2,857,356, 3,528,940, and 5,308,887, and Great Britain Patent No. 998, 232. The MQ resin and the polydiorganosiloxane can be intercondensed, which provides intra- and inter-condensation within the adhesive composition. Condensation between the copolymeric silicone resin and the polydiorganosiloxane can be effected either in the presence of catalyst at ambient or elevated temperature, or in the absence of catalyst at elevated temperatures.

A silicone pressure sensitive adhesive composition that includes the intercondensation product of a silanol functional polydiorganosiloxane and a silanol functional MQ resin, as discussed above, can optionally include a free radical polymerization catalyst, such as a diaryl peroxide crosslinker, to crosslink the adhesive composition, thereby improving the high temperature shear properties of the silicone pressure sensitive adhesive composition with only a slight loss in peel adhesion as taught in *The Handbook of Pressure-Sensitive Adhesive Technology*, (Satas, 1982).

Silicone pressure sensitive adhesive compositions prepared by addition-cure chemistry generally include polydiorganosiloxanes having alkenyl groups, MQ silicone resins that include $R_3SiO_{1/2}$ and $SiO_{4/2}$ structural units, wherein R is as defined previously having one or more of the following functionalities: silicone-bonded hydrogen, silicone bonded alkenyl groups such as those selected from the group consisting of vinyl, allyl, propenyl and higher alkenyl groups; or silanol, optionally a crosslinking or chain extending agent, and Pt or other noble metal hydrosilation catalyst to effect the curing of the silicone pressure sensitive adhesive composition. Examples of such compositions are found in U.S. Pat. Nos. 3,527,842; 3,983,298; 4,774,297; European Patent Publication Nos. 355,991, and 393,426, and Kokai HEI 2-58587.

Wide ranges of commercially available silicone pressure sensitive adhesive compositions are suitable. Examples of such silicone pressure sensitive adhesive compositions include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), and PSA 529, PSA 750-D1, PSA 825-D1, and PSA 800-C. Also useful are various blends of silicone pressure sensitive adhesive compositions, such as blends of two different dimethylsiloxane-based silicone pressure sensitive adhesive compositions, as taught in *The Handbook of Pressure-Sensitive Adhesive Technoloy*, (Satas, 1982), p. 346, or blends of dimethylsiloxane-based silicone pressure sensitive adhesive compositions with dimethylsiloxane/diphenylsiloxane-based pressure sensitive adhesive compositions as described in U.S. Pat. No. 4,925,671.

The silicone elastomeric polymers can be prepared by solvent-based processes, solventless processes or a combination thereof. Useful solvent-based processes are described in, e.g., Tyagi et al., "Segmented Organosiloxane Copolymers: 2. Thermal and Mechanical Properties of Siloxane-Urea Copolymers," Polymer, vol. 25, December, 1984, and U.S. Pat. No. 5,214,119. Useful methods of manufacturing silicone elastomeric polymers are also described in, e.g., U.S. Pat. Nos. 5,512,650, 5,214,119, and 5,461,134, US Patent Publication No. 2007-0148475, and PCT Publication Nos. WO 96/35458, WO 98/17726, WO 96/34028, and WO 97/40103.

Useful silicone-based pressure sensitive adhesive compositions typically include an MQ tackifying resin and a silicone elastomeric polymer. The MQ tackifying resin and the silicone elastomeric polymer generally are present in the form of a blend of MQ tackifying resin and silicone polymer. Typically the silicone polymer is present in the silicone-based pressure sensitive adhesive composition in an amount of from about 30% by weight to about 90% by weight, 30% by weight to 85% by weight, 30% by weight to 70% by weight, or even 45% by weight to 55% by weight. The MQ tackifying resin, if present, is typically present in an amount of at least 10% by weight. In some embodiments, the MQ tackifying resin is present in the silicone-based pressure sensitive adhesive composition in an amount of from about 15% by weight to about 70% by weight, from about 30% by weight to about 70% by weight, or from about 40% by weight to about 60% by weight, or even 45% by weight to 55% by weight.

Useful MQ tackifying resins include, e.g., MQ silicone resins, MQD silicone resins, and MQT silicone resins, which also may be referred to as copolymeric silicone resins and which typically have a number average molecular weight of about 100 to about 50,000, or about 500 to about 20,000 and generally have methyl substituents. The MQ silicone resins include both non-functional and functional resins, the functional resins having one or more functionalities including, for example, silicon-bonded hydrogen, silicon-bonded alkenyl, and silanol.

MQ silicone resins are copolymeric silicone resins having $R'_3SiO_{1/2}$ units (M units) and $SiO_{4/2}$ units (Q units). Such resins are described in, for example, Encyclopedia of Polymer Science and Engineering, vol. 15, John Wiley & Sons, New York, (1989), pp. 265 to 270, and U.S. Pat. Nos. 2,676, 182; 3,627,851; 3,772,247; and 5,248,739. MQ silicone resins having functional groups are described in U.S. Pat. No. 4,774,310, which describes silyl hydride groups, U.S. Pat. No. 5,262,558, which describes vinyl and trifluoropropyl groups, and U.S. Pat. No. 4,707,531, which describes silyl hydride and vinyl groups. The above-described resins are generally prepared in solvent. Dried or solventless MQ silicone resins are prepared as described in U.S. Pat. Nos. 5,319, 040; 5,302,685; and 4,935,484.

MQD silicone resins are terpolymers having $R'_3SiO_{1/2}$ units (M units), $SiO_{4/2}$ units (Q units), and $R'_2SiO_{2/2}$ units (D units) as described, e.g., in U.S. Pat. No. 5,110,890 and Japanese Kokai HEI 2-36234.

MQT silicone resins are terpolymers having $R_3SiO_{1/2}$ units (M units), $SiO_{4/2}$ units (Q units), and $RSiO_{3/2}$ units (T units) (MQT resins).

Commercially available MQ resins include SR-545 MQ resin in toluene available from General Electric Co., Silicone Resins Division (Waterford, N.Y.), MQOH resins which are MQ silicone resins in toluene available from PCR, Inc. (Gainesville, Fla.). Such resins are generally supplied in organic solvent. These organic solutions of MQ silicone resin may be used as is or may be dried by any number of techniques known in the art including, e.g., spray drying, oven drying, and steam separation, to provide a MQ silicone resin at 100 percent non-volatile content. The MQ silicone resin can also include blends of two or more silicone resins.

Just as the silicone elastomeric polymers may be made from a variety of processes, the silicone-based pressure sensitive adhesive compositions may also be prepared by a variety of processes. The compositions may be prepared in a solvent-based process, a solventless process or a combination thereof.

In solvent-based processes, the MQ silicone resin, if used, can be introduced before, during or after the reactants used to form the polymer, such as polyamines and polyisocyanates, have been introduced into the reaction mixture. The reaction may be carried out in a solvent or a mixture of solvents. The solvents are preferably nonreactive with the reactants. The starting materials and final products preferably remain completely miscible in the solvents during and after the completion of the polymerization. These reactions can be conducted at room temperature or up to the boiling point of the reaction solvent. The reaction is generally carried out at ambient temperature up to 50° C. Additionally, the elastomeric polymer may be prepared in a solvent mixture with the MQ resin added later, after the polymer has been formed.

In substantially solventless processes, the reactants used to form the polymer and the MQ silicone resin, if used, are mixed in a reactor and the reactants are allowed to react to form the silicone elastomeric polymer, and thus form the pressure sensitive adhesive composition. Additionally, the silicone elastomeric polymer can be made in a solventless process, in for example a mixer or extruder, and either be isolated or simply transferred to an extruder and mixed with MQ silicone resin.

One useful method that includes a combination of a solvent-based process and a solventless process includes preparing the silicone elastomeric polymer using a solventless process and then mixing the silicone elastomeric polymer with the MQ resin solution in a solvent.

The optically clear stretch releasing pressure sensitive adhesive may be in the form a film. Such a film may be free standing or may be disposed on a substrate. The substrate may be a release liner, a rigid surface, a tape backing, a film, or a sheet. The stretch releasing pressure sensitive adhesive film can be prepared using a variety of common methods for preparing pressure sensitive adhesive films. For example, the pressure sensitive adhesive composition can be coated onto a release liner, coated directly onto a substrate or a backing, or formed as a separate layer (e.g., coated onto a release liner) and then laminated to a substrate. In some embodiments the pressure sensitive adhesive film is a transfer tape, i.e. it is disposed between two release liners.

In some embodiments it may be desirable to impart a microstructured surface to one or both major surfaces of the adhesive. It may be desirable to have a microstructured surface on at least one surface of the adhesive to aid air egress during lamination. If it is desired to have a microstructured surface on one or both surfaces of the adhesive film, the adhesive coating or film may be placed on a tool or a liner containing microstructuring. The liner or tool can then be removed to expose an adhesive film having a microstructured surface. Generally with optical applications it is desirable that the microstructure disappear over time to prevent interference with optical properties.

In some embodiments the pressure sensitive adhesive film comprises a single layer. In other embodiments the pressure sensitive adhesive film comprises multiple layers, i.e. additional layers are present in addition to the pressure sensitive adhesive. Where multiple layers are present, the additional layers may be films, foams, or additional elastomers or pressure sensitive adhesives as long as the additional layers are optically clear and extensible and do inhibit the function of the optically clear stretch releasing pressure sensitive adhesive. When elastomers or pressure sensitive adhesives are used as the additional layers, they may be prepared using standard solventborne and/or solventless techniques. For some solventless techniques the additional elastomer or pressure sensitive adhesive layer may be prepared by a coat and cure technique. In this technique a coatable mixture may be coated onto a web (such as a release liner for example) or coated onto the pressure sensitive film of this disclosure, and then subjected to curing, generally photochemically. If the coatable mixture contains only monomers, the viscosity may not be sufficiently high to be readily coatable. Several techniques may be used to generate a mixture with a coatable viscosity. A viscosity modifying agent may be added such as high or relatively high molecular weight species or the monomer mixture can be partially prepolymerized to give a coatable syrup as described in, for example, U.S. Pat. No. 6,339, 111 (Moon, et al.).

In some embodiments the stretch releasing pressure sensitive adhesive film can be in the form of a tape disposed on a backing. The backing can include single layer and multi-layer constructions. Useful backings include, e.g., a polymeric foam layer, a polymeric film layer, and combinations thereof, provided such backings have the proper optical and extensibility properties.

Potentially useful polymeric backing materials are disclosed in U.S. Pat. No. 5,516,581 and PCT Publication No. WO 95/06691.

Representative examples of potentially useful polymeric backing materials for polymeric foam layers or solid polymeric film layers include polyolefins, e.g., polyethylene, including high density polyethylene, low density polyethylene, linear low density polyethylene, and linear ultra low density polyethylene, polypropylene and polybutylenes; vinyl copolymers, e.g., polyvinyl chlorides, both plasticized and unplasticized, and polyvinyl acetates; olefin copolymers, e.g., ethylene/methacrylate copolymers, ethylene/vinylacetate copolymers, acrylonitrile-butadiene-styrene copolymers, and ethylene/propylene copolymers; acrylic polymers and copolymer; and combinations thereof. Mixtures or blends of any plastic or plastic and elastomer materials, such as polypropylene/polyethylene, polyurethane/polyolefin, polyurethane/polycarbonate, and polyurethane/polyester, can also be used.

Polymeric foams can be selected to optimize tape properties such as conformability and resiliency, which are useful when the tape is to be adhered to surfaces having surface irregularities, e.g., painted wallboard. Conformable and resilient polymeric foams are well suited for applications in which the adhesive tape is to be adhered to surfaces having surface irregularities. Such is the case with a typical wall surface. Polymeric foam layers for use in the backing generally will have a density of about 2 to about 30 pounds per cubic foot (about 32 to about 481 kg/m$^3$), particularly in tape constructions where the foam is to be stretched to effect debonding.

Where only one polymeric film or foam layer of a multilayer backing is intended to be stretched to effect debonding, that layer should exhibit sufficient physical properties and be of a sufficient thickness to achieve that objective.

Polymeric films may be used to increase load bearing strength and rupture strength of the tape. Films are particularly well suited to applications involving adhering smooth surfaces together. A polymeric film layer typically has a thickness of about 10 micrometers (0.4 mil) to about 254 micrometers (10 mils).

The backing can include an elastomeric material. Suitable elastomeric backing materials include, e.g., styrene-butadiene copolymer, polychloroprene (i.e., neoprene), nitrile rubber, butyl rubber, polysufide rubber, cis-1,4-polyisoprene, ethylene-propylene terpolymers (e.g., EPDM rubber), silicone rubber, silicone elastomers such as silicone polyurea block copolymers, polyurethane rubber, polyisobutylene, natural rubber, acrylate rubber, thermoplastic rubbers, e.g., styrene-butadiene block copolymers and styrene-isoprene-styrene block copolymers, and thermoplastic polyolefin rubber materials.

Because of the potential difficulties of retaining optical clarity and extensibility in a multilayer construction, in many embodiments the pressure sensitive adhesive film is a single layer construction.

The optically clear stretch releasing pressure sensitive adhesive film includes a tacky tab, as illustrated in the FIG. 1. In FIGS. 1, 16 and 18 are substrates and 12 is the optically clear and stretch releasing pressure sensitive adhesive film. The tacky tab is represented by 10. The tacky tab, 10, can be grasped and pulled by a user to stretch the tape during the removal process, so as to remove the tape from the object or substrate to which it has been affixed. The tacky tab is an extension of the optically clear stretch releasing pressure sensitive adhesive. Because in many optical uses it is desirable to keep the size of the tab to a minimum, the tacky nature of the tab aids the grasping of the tab by the user.

While FIG. 1 shows one construction suitable for a user to stretch release the pressure sensitive adhesive, other constructions are possible. In particular it may be desirable for one of the substrates, either rigid or non-rigid, to have a segment which overlaps with the tacky tab. This overlap segment may serve to hide the tacky tab during the working life of the pressure sensitive adhesive but is not permanently adhered to it. Typically, the overlap is either removable or positioned in such a way as to not interfere with the user's grasp of the tacky tab. Examples of removable overlaps include tear away strips, break away segments of rigid substrates and the like.

In some applications it may be desirable to use a collection tool, such as a winding tool, to aid the stretch removal of the pressure sensitive adhesive film. Such a tool can aid in the collection of the pressure sensitive adhesive film as it is removed. An example of such a tool is a winding tool, that may be as simple as a piece of plastic, wood, metal, cardboard, etc to which the tacky tab is attached to permit winding of the pressure sensitive adhesive film as it is stretch removed, or it may be a more complex instrument. Collection of the pressure sensitive adhesive film with a collection tool may be more desirable than continuous linear stretching of the pressure sensitive adhesive film in instances where space is limited, such as, for example, in a factory assembly line.

The stretch releasing pressure sensitive adhesive film may be used to make articles. Such articles include optical articles which may include an optical film, a substrate or both. Optical articles may be used in wide array of optical applications including information displays, window coverings, graphic articles, handheld electronic devices, projection systems, protective films, touch sensors and the like.

Examples of information display devices include devices with a wide range of display area configurations including liquid crystal displays, plasma displays, front and rear projection displays, cathode ray tubes and signage. Such display area configurations can be employed in a variety of portable and non-portable information display devices including personal digital assistants, cell phones, touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, bumper stickers, etc) reflective sheeting and the like.

Articles are provided that include 2 rigid substrates and a pressure sensitive adhesive film between the 2 rigid substrates. As used herein, the term "rigid substrate" refers to substrates that are rigid or substantially rigid. For example, rigid substrates include glass sheets, rigid polymeric sheets and display surfaces. Examples of applications where lamination of one rigid substrate to another rigid substrate include, for example, CRT (cathode ray tube) and LCD (liquid crystal display) display screens protected by a rigid sheet such as antireflection (AR) or protective cover glass. Examples of devices that may utilize such laminations include such devices as portable and non-portable information display devices including personal digital assistants, cell phones, touch-sensitive screens, wrist watches, car navigation systems, global positioning systems, projection television screens, computer monitors, notebook computer displays, and the like. It has been observed that bonding of the rigid cover to the display screen, and thus eliminating any air gap between them, provides improvement in the quality of the displayed image.

Stretch releasing optically clear pressure sensitive adhesives are particularly useful in such systems, because, if defects are detected during fabrication of the devices containing them, the rigid cover can be removed by stretch releasing the optical pressure sensitive adhesive and the device can be re-laminated to provide a defect-free lamination. Also, over the lifetime of the device, if it is desirable to remove the rigid cover sheet for replacement or recycling, the rigid cover can be removed by stretch releasing the optical pressure sensitive adhesive. Such removal is not possible with curing optical adhesives and is very difficult even with pressure sensitive adhesives.

Articles are provided that include an optical film and a pressure sensitive adhesive film adjacent to at least one major surface of the optical film. The articles can further include another substrate (e.g., permanently or temporarily attached to the pressure sensitive adhesive layer), another adhesive layer, or a combination thereof. As used herein, the term "adjacent" can be used to refer to two layers or films that are in direct contact or that are separated by one or more layers or films. Often, adjacent layers or films are in direct contact.

In some embodiments, the resulting articles can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, screens or displays, cathode ray tubes, polarizers, reflectors, touch sensors and the like.

Any suitable optical film can be used in the articles. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, infrared reflective films, ultraviolet reflective films, reflective polarizer films such as a brightness enhancement films and dual brightness enhancement films, absorptive polarizer films, optically clear films, tinted films, and antireflective films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. Nos. 6,049,419, 5,223,465, 5,882,774, 6,049,419, RE 34,605, 5,579,162, and 5,360,659.

The substrate included in the article can contain polymeric materials, glass materials, ceramic materials, metal-containing materials (e.g., metals or metal oxides), or a combination thereof. The substrate can include multiple layers of material such as a support layer, a primer layer, a hard coat layer, a decorative design, and the like. The substrate can be permanently or temporarily attached to an adhesive film. For example, a release liner can be temporarily attached and then removed for attachment of the adhesive film to another substrate.

The substrate can have a variety of functions such as, for example, providing flexibility, rigidity, strength or support, reflectivity, antireflectivity, polarization, or transmissivity (e.g., selective with respect to different wavelengths). That is, the substrate can be flexible or rigid; reflective or non-reflective; visibly clear, colored but transmissive, or opaque (e.g., not transmissive); and polarizing or non-polarizing.

Exemplary substrates include, but are not limited to, the outer surface of an electronic display such as liquid crystal display or a cathode ray tube, the outer surface of a window or glazing, the outer surface of an optical component such as a reflector, polarizer, diffraction grating, mirror, or lens, another film such as a decorative film or another optical film, or the like.

Representative examples of polymeric substrates include those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

In other embodiments, the substrate is a release liner. Any suitable release liner can be used. Examples of suitable liners include paper, e.g., kraft paper, or polymeric films, e.g., polyethylene, polypropylene or polyester. At least one surface of the liner can be treated with a release agent such as silicone, a fluorochemical, or other low surface energy based release material to provide a release liner. Suitable release liners and methods for treating liners are described in, e.g., U.S. Pat. Nos. 4,472,480, 4,980,443 and 4,736,048. The liner can have a microstructure on its surface that is imparted to the adhesive to form a microstructure on the surface of the adhesive film. The liner can then be removed to expose an adhesive film having a microstructured surface.

The release liners can be printed with lines, brand indicia, or other information.

The thickness of the adhesive film tends to be at least about 20 micrometers and is often no greater than about 1,500 micrometers. In some embodiments the thickness can be 25 to 1,270 micrometers, 50 to 1,000 micrometers, or 100 to 750 micrometers.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

| Table of Abbreviations | |
|---|---|
| Abbreviation or Trade Designation | Description |
| PDMS diamine 33,000 | an approximately 33,000 molecular weight polydimethylsiloxane diamine prepared as described in Example 2 of U.S. Pat. No. 5,461,134. |
| MQ Resin-1 | a 60% solids solution of MQ silicone resin in toluene, commercially available from GE Silicones; Waterford, NY under the trade designation "SR-545". |
| Polyamine-1 | an organic diamine, commercially available from DuPont, Wilmington, DE under the trade designation "DYTEK A". |
| H12MDI | methylenedicyclohexylene-4,4'-diisocyanate, commercially available from Bayer, Pittsburgh, PA under the trade designation "DESMODUR W". |
| 14K PDMS diamine | A polydimethylsiloxane diamine with an average molecular weight of about 14,000 g/mole that was prepared as described in U.S. Pat. No. 5,214,119. |
| DEO | Diethyl Oxalate |
| ED | Ethylene Diamine |
| MXDA | Meta-xylylene diamine |
| THF | Tetrahydrofuran |
| 5K PDMS diamine | A polydimethylsiloxane diamine with an average molecular weight of about 5,000 g/mole that was prepared as described in U.S. Pat. No. 5,214,119. |
| PSA-1 | The commercially available polydimethylsiloxane gum and resin dispersion from Dow Corning, Midland, MI, available as "DOW CORNING Q2-7735 Adhesive". |
| Transfer Tape-1 | Acrylic adhesive transfer tape of 127 micrometer (5 mils) thickness commercially available from 3M Company under the tradename "8185". |
| Microscope Slides | Glass microscope slides with dimensions 75 millimeters × 38 millimeters × 1 millimeter thickness, commercially available from Erie Scientific as ESCO microscope glades. |
| Transfer Tape-2 | Acrylic adhesive transfer tape of 51 micrometers (2 mils) thickness with a composition of 97% isooctyl acrylate and 3% acrylamide prepared in solution as described in US Patent RE 24,906 (Ulrich) and solvent cast and dried onto a silicone release liner (liner commercially available from CP Film, Martinsville, VA under the trade designation "T-10"). |

Test Methods

Titration Method to Determine Equivalent Weight

Ten (10) grams (precisely weighed) of the compound of to be tested was added to a jar. Approximately 50 grams THF solvent (not precisely weighed) was added. The contents were mixed using a magnetic stir bar mix until the mixture was homogeneous. The theoretical equivalent weight of precursor was calculated and then an amount of N-hexylamine (precisely weighed) in the range of 3 to 4 times this number of equivalents was added. The reaction mixture was stirred for a minimum of 4 hours. Bromophenol blue (10-20 drops) was added and the contents were mixed until homogeneous. The mixture was titrated to a yellow endpoint with 1.0N hydrochloric acid. The number of equivalents of precursor was equal to the number of equivalents of N-hexylamine added to the sample minus the number of equivalents of hydrochloric acid added during titration. The equivalent weight (grams/equivalent) was equal to the sample weight of the precursor divided by the number of equivalents of the precursor.

Inherent Viscosity (IV)

Average inherent viscosities (IV) were measured at 30° C. using a Canon-Fenske viscometer (Model No. 50 P296) in a THF solution at 30° C. at a concentration of 0.2 g/dL Inherent viscosities of the materials tested were found to be essentially independent of concentration in the range of 0.1 to 0.4 g/dL. The average inherent viscosities were averaged over 3 or more runs. Any variations for determining average inherent viscosities are set forth in specific Examples.

Adhesive Film Preparation and Stretch Release Testing

Adhesive compositions were coated onto a release liner, LOPAREX 5100 PET release liner (Loparex LLC, Willowbrook, Ill.), and dried to a thickness of 178 micrometers (7 mils). The adhesive was laminated to a glass plate with a thickness of 0.64 centimeters (0.25 inch), leaving a tab of approximately 0.64 centimeters (0.25 inch) hanging over the edge of the glass plate to form a tacky tab. The release liner was removed and a second glass plate was laminated to the exposed adhesive surface to form a glass/adhesive/glass construction with a tacky tab. The tacky tab was grasped and pulled at an approximately 0° angle to the glass surfaces to debond the two pieces of glass. Both glass plates were checked for adhesive residue.

Optical Properties

The transmission, haze and clarity of adhesive samples were tested by preparing laminates of the adhesive on a 8 centimeter×5 centimeter, 51 micrometer thick piece of polyester and covering with a 51 micrometer thick piece of release liner and measuring the properties using a HB 4725 Haze-Gard Plus commercially available from BYK-Gardner USA, Columbia, Md.

180° Peel Adhesion

This peel adhesion test is similar to the test method described in ASTM D 3330-90, substituting a glass substrate for the stainless steel substrate described in the test.

Unless otherwise noted, adhesive coatings of 178 micrometers (7 mils) thickness on polyester film were cut into 1.27 centimeter by 15 centimeters strips. Each strip was then adhered to a 10 centimeters by 20 centimeters clean, solvent washed, glass coupon using a 2-kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 2.3 meters/minute (90 inches/minute) over a five second data collection time. Two samples were tested; the reported peel adhesion value was an average of the peel adhesion value from each of the two samples. Peel adhesion values were recorded in ounces/inch and converted to Newtons/decimeter (N/dm).

Example 1

A pressure sensitive adhesive composition with an elastomer containing a molar ratio of silicone diamine/polyamine-1/H12MDI of 1/1/2 was formulated with 50 weight % MQ Resin-1. The formulation was prepared by placing 14.86 parts PDMS diamine 33,000 in a glass reactor with 0.05 parts Polyamine-1, 39.00 parts toluene and 21.00 parts 2-propanol. 0.23 parts H12MDI was added to the solution, the mixture was stirred at room temperature for two hours and became viscous. To this was added 25.00 parts of MQ Resin-1. The solution was coated and tested using the Adhesive Film Preparation and Stretch Release Test Method described above. No adhesive residue was observed on either glass plate. Optical properties and 180° Peel adhesion were measured using the test methods described above. The data are presented in Table 1.

Example 2

A pressure sensitive adhesive composition with the same elastomer prepared in Example 1 was used with 30 weight % MQ Resin-1. The solution was coated and tested using the Adhesive Film Preparation and Stretch Release Test Method described above. No adhesive residue was observed on either glass plate. Optical properties and 180° Peel adhesion were measured using the test methods described above. The data are presented in Table 1.

Example 3

A pressure sensitive adhesive composition with the same elastomer prepared in Example 1 was used with 15 weight % MQ Resin-1. The solution was coated and tested using the Adhesive Film Preparation and Stretch Release Test Method described above. No adhesive residue was observed on either glass plate. Optical properties and 180° Peel adhesion were measured using the test methods described above. The data are presented in Table 1.

Preparative Example 1

A sample of 14K PDMS diamine (830.00 grams) was placed in a 2-liter, 3-neck resin flask equipped with a mechanical stirrer, heating mantle, nitrogen inlet tube (with stopcock), and an outlet tube. The flask was purged with nitrogen for 15 minutes and then, with vigorous stirring, diethyl oxalate (33.56 grams) was added dropwise. This reaction mixture was stirred for approximately one hour at room temperature and then for 75 minutes at 80° C. The reaction flask was fitted with a distillation adaptor and receiver. The reaction mixture was heated under vacuum (133 Pascals, 1 Torr) for 2 hours at 120° C. and then 30 minutes at 130° C., until no further distillate was able to be collected. The reaction mixture was cooled to room temperature to provide the ethyl oxalylamidopropyl terminated PDMS diamine. Gas chromatographic analysis of the clear, mobile liquid showed that no detectable level of diethyl oxalate remained. The ester equivalent weight was determined using $^1$H NMR (equivalent weight equal to 7,916 grams/equivalent) and by titration (equivalent weight equal to 8,272 grams/equivalent).

Example 4

Into a 20° C. stainless steel reaction vessel, 18,158.4 grams of the precursor of Preparative Example 1, was placed. The vessel was subjected to agitation (75 rpm), and purged with nitrogen flow and vacuum for 15 minutes. The vessel was heated to 80° C. over the course of 25 minutes. 73.29 grams of MXDA were vacuum charged into the vessel, followed by 73.29 grams of toluene (also vacuum charged). The vessel was pressurized to 6,895 Pascals (1 psig) and heated to a temperature of 120° C. After 30 minutes, the vessel was heated to 150° C. Once a temperature of 15° C. was reached, the vessel was vented over the course of 5 minutes. The vessel was subjected to vacuum (approximately 65 mmHg) for 40 minutes to remove the ethanol and toluene. The vessel was pressured to 13,790 Pascals (2 psig) and the viscous molten polymer was drained into Teflon coated trays and allowed to cool. The cooled silicone polyoxamide product, polydiorganosiloxane polyoxamide block copolymer, was ground into fine pellets. The IV of this material was determined to be 0.829 g/dL (in THF).

The resulting polydiorganosiloxane polyoxamide block copolymer was dissolved in ethyl acetate and mixed with 7.42 parts MQ Resin-1 to form a pressure sensitive adhesive composition, with 50% by weight MQ Resin-1. The solution was coated and tested using the Adhesive Film Preparation and Stretch Release Test Method described above. No adhesive residue was observed on either glass plate. Optical properties were measured using the test method described above. The data are presented in Table 1.

Example 5

This example was prepared as in Example 4 except that 1.0 mole % of the MXDA was replaced with an equal number of moles of ED in the formation of the elastomer. The elastomer was mixed with 30% by weight MQ Resin-1 to form a pressure sensitive adhesive composition. The solution was coated and tested using the Adhesive Film Preparation and Stretch Release Test Method described above. No adhesive residue was observed on either glass plate. Optical properties and 180° Peel adhesion were measured using the test methods described above. The data are presented in Table 1.

Example 6

This example was prepared with the same elastomer as in Example 5 and mixed with 15% by weight MQ Resin-1 to form a pressure sensitive adhesive composition. The solution was coated and tested using the Adhesive Film Preparation and Stretch Release Test Method described above. No adhesive residue was observed on either glass plate. Optical properties and 180° Peel adhesion were measured using the test methods described above. The data are presented in Table 1.

TABLE 1

| Example | Transmission (%) | Haze (%) | Clarity (%) | 180° Peel Adhesion (N/dm) |
|---|---|---|---|---|
| 1 | 96.4 | 2.05 | 92.4 | 88.8 |
| 2 | 96.5 | 1.22 | 90.8 | 7.1 |
| 3 | 96.4 | 1.80 | 91.4 | 2.8 |
| 4 | 96.3 | 7.00 | 93.4 | NT |
| 5 | 96.4 | 2.25 | 89.6 | 13.3 |
| 6 | 96.5 | 2.09 | 92.8 | 1.5 |

NT = Not tested

Example 7

To a solution of 152.2 parts of methyl salicylate and 101.2 parts triethylamine in toluene (30%) was added dropwise with stirring a 40% solution of 91.5 parts of adipoyl chloride in toluene. An immediate precipitate of triethylamine hydrochloride formed. Stirring was continued for 1 hour after addition was complete. The mixture was filtered, and the filtrate was evaporated to dryness in a rotary evaporator to provide a white crystalline solid. The product, the di-methyl salicylate of adipic acid, was isolated by slurrying in hexane and filtering and dried in an oven. The product was pure by TLC and NMR spectrum.

A 30% by weight solution of 526.0 parts of a 5K PDMS diamine and 11.6 parts of hexamethylene diamine in isopropyl alcohol was prepared. A 30% by weight solution in isopropyl alcohol of 82.9 parts of the methyl salicylate adipate ester (prepared as above) was prepared and this solution was added suddenly to the first solution. The clear solution was stirred at room temperature overnight during which time the viscosity of the solution rose significantly. The solution was cast into a glass tray, the solvent allowed to evaporate over several hours, and dried completely in an oven at 70° C. overnight to provide a clear, strong elastomeric film of silicone polyadipamide. The silicone polyadipamide was dissolved in a 50 wt % methyl ethyl ketone/50 wt % isopropanol blend at 10 wt % solids.

Example 8

An adhesive composition was prepared using PSA-1. The dispersion of PSA-1 was cured with 0.5 weight % dichlorobenzoyl peroxide and coated on a release liner to a dry thickness of 76 micrometers (3 mils). The coated adhesive was folded upon itself to form an adhesive layer of 152 micrometers (6 mils). The adhesive was laminated to a glass plate with a thickness of 0.64 centimeters (0.25 inch), leaving a tab of approximately 0.64 centimeters (0.25 inch) hanging over the edge of the glass plate to form a tacky tab. The release liner was removed and a second glass plate was laminated to the exposed adhesive surface to form a glass/adhesive/glass construction with a tacky tab. The tacky tab was grasped and pulled at an approximately 0° angle to the glass surfaces to debond the two pieces of glass. No adhesive residue was observed on either glass plate.

Example 9

A pressure sensitive adhesive composition with an elastomer containing a molar ratio of silicone diamine/polyamine-1/H12MDI of 1/1/2 was formulated with 58 weight % MQ Resin-1. The formulation was prepared by placing 14.86 parts PDMS diamine 33,000 in a glass reactor with 0.05 parts Polyamine-1, 39.00 parts toluene and 21.00 parts 2-propanol. 0.23 parts H12MDI was added to the solution, the mixture was stirred at room temperature for two hours and became viscous. To this was added 29.00 parts of MQ Resin-1. The solution was coated onto a release liner and dried to form a dry adhesive coating of 25 micrometers (1 mil) thickness. Two samples of this adhesive were laminated to each side of Transfer Tape-1 to give a 3 layer construction with a thickness of 178 micrometers (7 mils). This multilayer construction was laminated between 2 Microscope Slides, leaving a tab of approximately 0.64 centimeters (0.25 inch) hanging over the edge of the glass plate to form a tacky tab. After dwelling for 24 hours at room temperature, the slides could not be taken apart by hand. The tacky tab was pulled at zero angle from the bond line and the tape was able to be stretched from the bond line with out breaking. The two glass slides came apart and no adhesive residue was observed on either slide.

Example 10

A pressure sensitive adhesive composition with an elastomer containing a molar ratio of silicone diamine/polyamine-1/H12MDI of 1/1/2 was formulated with 58 weight % MQ Resin-1. The formulation was prepared by placing 14.86 parts PDMS diamine 33,000 in a glass reactor with 0.05 parts Polyamine-1, 39.00 parts toluene and 21.00 parts 2-propanol. 0.23 parts H12MDI was added to the solution, the mixture was stirred at room temperature for two hours and became viscous. To this was added 29.00 parts of MQ Resin-1. The solution was coated onto a release liner and dried to form a dry adhesive coating of 25 micrometers (1 mil) thickness. Samples of Transfer Tape-2 were laminated to each other to form a transfer tape of 102 micrometer (4 mils) thickness and two samples of the test adhesive were laminated to each side of the double thick Transfer Tape-2 to give a 3 layer construction with a thickness of 152 micrometers (6 mils). This multilayer construction was laminated between 2 Microscope Slides, leaving a tab of approximately 0.64 centimeters (0.25 inch) hanging over the edge of the glass plate to form a tacky tab. After dwelling for 24 hours at room temperature, the slides could not be taken apart by hand. The tacky tab was pulled at zero angle from the bond line and the tape was able to be stretched from the bond line with out breaking. The two glass slides came apart and no adhesive residue was observed on either slide.

What is claimed is:

1. An assembly comprising:
    a first substrate;
    a second substrate; and
    a stretch releasing pressure sensitive adhesive disposed between the first substrate and the second substrate wherein the stretch releasing pressure sensitive adhesive comprising:
        a silicone pressure sensitive adhesive composition; and
        a tacky tab consisting of the silicone pressure sensitive adhesive composition and is capable of being grasped and pulled, and wherein the silicone pressure sensitive adhesive composition is optically clear and comprises an elastomeric silicone polymer selected from the group consisting of urea-based silicone copolymers, oxamide-based silicone copolymers, amide-based silicone copolymers, urethane-based silicone copolymers, and mixtures thereof.

2. The assembly of claim 1, wherein the silicone pressure sensitive adhesive composition comprises:
    the elastomeric silicone polymer; and
    from about 10% by weight to about 70% by weight MQ resin.

3. The assembly of claim 1 wherein the stretch releasing pressure sensitive adhesive comprises a single layer.

4. The assembly of claim 1 wherein the stretch releasing pressure sensitive adhesive is extensible.

5. The assembly of claim 4, wherein the stretch releasing pressure sensitive adhesive comprises additional extensible layers.

6. The assembly of claim 5 wherein at least one of the additional extensible layers comprises a pressure sensitive adhesive or an elastomer layer.

7. The assembly of claim 1 wherein the elastomeric silicone polymer comprises an amide-based silicone copolymer comprising at least two repeat units of the formula:

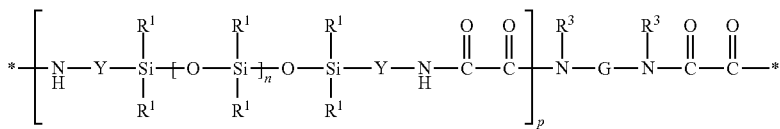

wherein each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is a divalent residue equal to a diamine of formula $R^3$HN-G-NHR$^3$ minus the two —NHR$^3$ groups;

$R^3$ is hydrogen or alkyl or $R^3$ taken together with G and to the nitrogen to which they are both attached form a heterocyclic group;

n is independently an integer of 0 to 1500; and p is an integer of 1 to 10.

8. The assembly of claim 1, wherein when the first substrate is bonded to the second substrate through the stretch releasing pressure sensitive adhesive, the stretch releasing pressure sensitive adhesive is capable of completely separating from one of the first substrate or the second substrate prior to completely separating from the other of the first substrate or the second substrate.

9. The assembly of claim 1, wherein each of the first substrate and the second substrate comprises a rigid surface, a tape backing, a film, a sheet, or a release liner.

10. The assembly of claim 9 wherein the first substrate comprises a rigid substrate selected from glass, ceramic, porcelain, polymer, metal, or wood.

11. The assembly of claim 9 wherein the second substrate comprises glass, ceramic polymeric, metal, wood, a polymeric film, an optical film, or a release liner.

12. The assembly of claim 1, wherein one of the first substrate or the second substrate comprises a removable overlap segment which overlays the tacky tab.

13. The assembly of claim 1 wherein the stretch releasing pressure sensitive adhesive further comprises an additional pressure sensitive adhesive or an elastomer.

\* \* \* \* \*